(No Model.) 2 Sheets—Sheet 1.
L. J. MILLER.
PNEUMATIC TIRE.
No. 574,440. Patented Jan. 5, 1897.
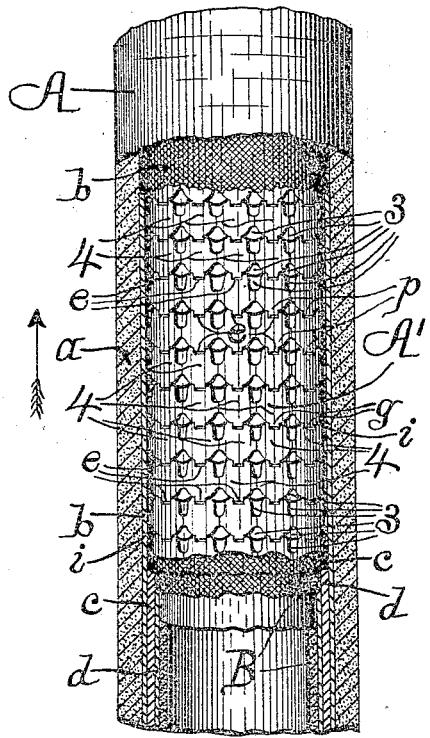
FIG-1-
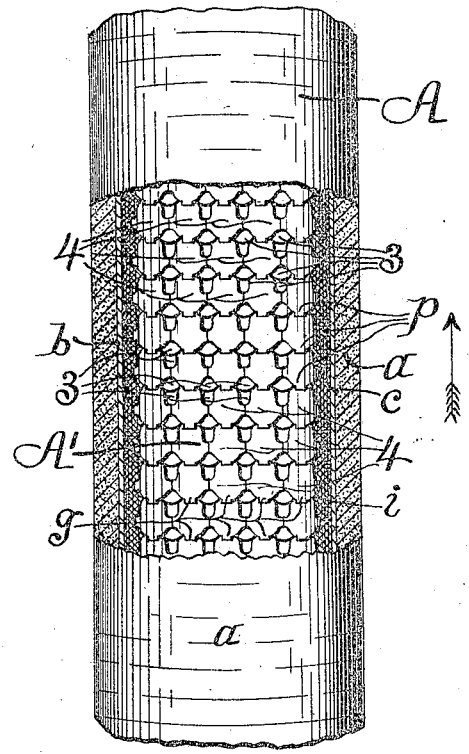
FIG-3-
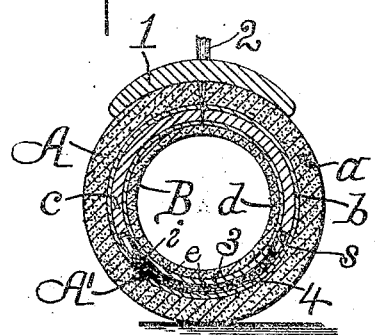
FIG-2-
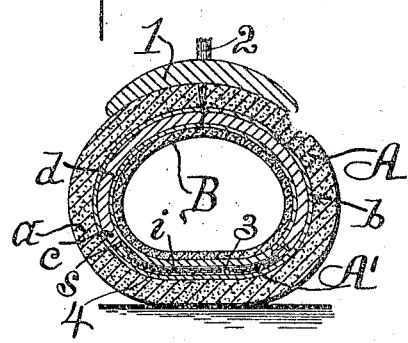
FIG-4-
ATTEST—
E. Kautemoller
Conrad Schauck
INVENTOR—
Lewis J. Miller,
By Cornell C. Raymond
his Atty.

(No Model.) 2 Sheets—Sheet 2.
L. J. MILLER.
PNEUMATIC TIRE.
No. 574,440. Patented Jan. 5, 1897.
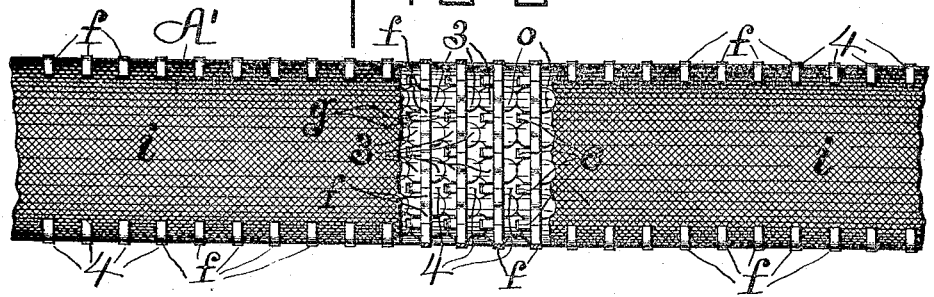
FIG-5-
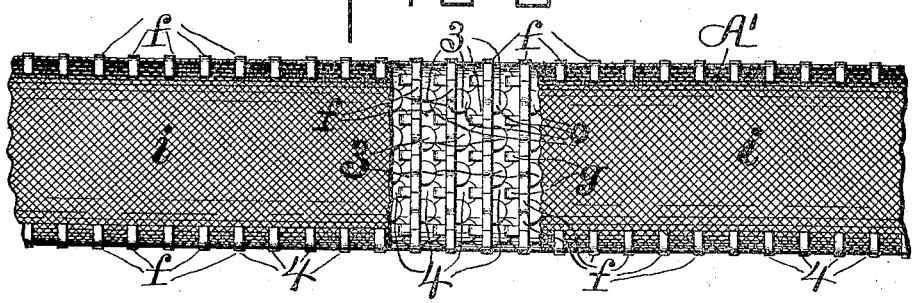
FIG-6-
FIG-7-
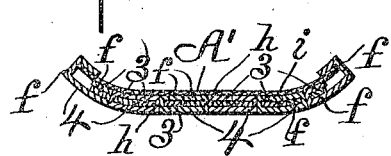
FIG-8-
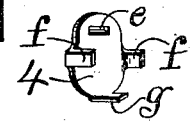
FIG-10-
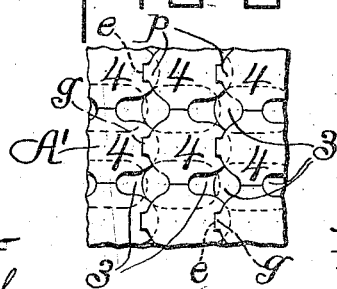
FIG-9-
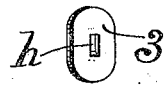
FIG-11-
WITNESSES:
INVENTOR,
Lewis J. Miller,
BY
his ATTORNEY.

UNITED STATES PATENT OFFICE.

LEWIS J. MILLER, OF BERGEN, NEW YORK, ASSIGNOR TO ORVILLE J. MILLER AND GEORGE D. WIEDRICH, OF SAME PLACE.

PNEUMATIC TIRE.

SPECIFICATION forming part of Letters Patent No. 574,440, dated January 5, 1897.

Application filed October 18, 1895. Serial No. 566,065. (No model.)

*To all whom it may concern:*

Be it known that I, LEWIS J. MILLER, a citizen of the United States, residing at Bergen, in the county of Genesee and State of New York, have invented certain new and useful Improvements in Pneumatic Tires; and I do hereby declare the following to be a full, clear, and exact description of the invention, such as will enable others skilled in the art to which it appertains to make and use the same, reference being had to the accompanying drawings, in which—

Figure 1 is a conjoint plan and sectional view of a portion of my annular continuous tire as appearing when that portion of the tread resting on the ground or away therefrom is non-compressed and perfectly cylindrical; Fig. 2, a transverse section through the same as disposed in aforestated attitude; Fig. 3, a conjoint plan and sectional view of a portion of said pneumatic tire as appearing when that tread part bearing directly on the ground is flattened or partially compressed through pressure; Fig. 4, a transverse section thereof in said stated presentation; Fig. 5, a rear face view, with a part of backing-canvas broken away, of a parti-length of the mail-like protective or non-puncturable strip-like covering embodied in the construction of my tire as appearing transversely rounded; Fig. 6, a like representation of aforesaid in a flattened attitude; Fig. 7, an enlarged transverse section of the protective flexible strip as disposed in Fig. 5; Fig. 8, an enlarged transverse section of the stated strip as disposed in Fig. 6, said mail-like strip carrying a backing, being in the four before-referred-to views delineated as segregated from the other portions entering into the construction of my improved air-filled tire. Fig. 9 is an exceedingly-enlarged detail of a fragment of my mail-like strip in plan, looking at its front or tread; Fig. 10, a greatly-enlarged detail, in isometric, of one of similarly-formed outer or tread plates or scales entering into the formation of the metallic protective strip; and Fig. 11 is a corresponding detail, isometric, of one of the inside plates or scales which, with others of like form, enters into the formation of the defensive band.

Similar letters and figures of reference indicate corresponding parts throughout the several views of the drawings.

My invention relates to that class of tires comprising either single or double tubes of elastic material containing compressed air and commonly denominated as "pneumatic tires."

The object of my invention is the production of a tire of the species referred to applicable to the rims of bicycle-wheels and analogous vehicles that is of such novel and useful construction as will absolutely preclude the possibility of the pointed ends of tacks, nails, &c., or the sharp or ragged edges of stones, from penetrating sufficiently through either a single or double tube pneumatic tire to create such puncturing as will admit of the escaping of air from the air-tube and consequent collapse of the tire; and my aim in particular is in such construction the utilization of a protective strip or band of mail-like formation and requisite flexibility composed of metallic plates or scales so coacting that said strip will act as a barrier to any penetration past it under any of the ordinary conditions attendant on the piercing of tires by tacks, &c.; and, furthermore, the purpose of my invention is the attainment of simple, durable, and satisfactory protective and defensive means incorporated in and combined with the wrapper or shoe of a tubular-like tire satisfactorily fulfilling all the requirements essential to the rendering of the air-tube puncture-proof.

My invention consists in the novel features of construction, operation, and adaptability hereinafter described, and specifically enumerated in the clauses of the claim hereto annexed.

It is constructed as follows: 1 denotes the customary rim of the wheel of a bicycle or other light vehicle—in this exemplification a wood rim being shown—and 2 the usual spokes leading from the rim to the hub.

A indicates the commonly-employed shoe or wrapper of a pneumatic tire, in this instance represented as a laced envelop or shoe of tubular shape and glued or otherwise secured to the rim 1, said shoe or wrapper being herein shown as comprising exteriorly a tubular-like layer *a*, of india-rubber or other elastic material of some thickness, and then interiorly a tube-like layer of canvas b, adhesive thereto, then an extra-thick semitubular layer of canvas or other satisfactory material c, so arranged as to leave an annular open space along the tread portion; A', my flexible metallic protective strip or band, seated in the space s left between the separated parallel edges of the layer c and in annular manner extending continuously around the tire, and of a width preferably somewhat wider than that of the tread or bearing portion of the shoe or wrapper A, i. e., that portion of the shoe's periphery traveling in contact with the ground incidental to a wheel's revolving, the said protective strip being composed of a series of metallic plates or scales backed by a retaining-layer of canvas or other fabric, while d denotes the internal tubular-shaped layer of canvas covering smoothly the longitudinally-split layer c and the back of the mail-like protective strip A', and which is, by adhesive means, thoroughly attached to the aforestated.

Removably occupying the interior or annular-like cylindrical bore of the wrapper or shoe A and extending in a continuous manner through it is the customary inflatable air-tube B, of light india-rubber or other satisfactory substance.

The flexible protective strip A' essentially comprises both an inner and an outer or external layer of conjointly-connected plates or scales 3 4, respectively, and which are so hinged one to another as permits of the segment or curvilinear-like bending of the strip of aggregated scales transversely throughout its annular extent, as well as a substantially flat-like or level disposition of said metallic strip simultaneously with the flattening of the tread of the other portions of the wrapper or shoe A when bearing on the ground and thereat partially compressed by reason of the weight of the occupant of a bicycle or other vehicle, while, furthermore, the connection of the series of plates 3 4 is such as to allow of an infinitesimal play or movement longitudinally the strip, i. e., contraction and elongation lengthwise, the purpose whereof will later be made evident.

The inner or rear plates or scales 3, arranged as represented, all slightly overlap in one longitudinal direction, as indicated at o, while the forward or outer plates or scales also lie slightly overlappingly in one direction longitudinally the strip formation, as denoted at p.

Normally, that is to say, when there is no compression of any selected portion of the shoe or wrapper A, and said portion and the interposed portion of the metallic puncture-proof strip is of a rounded contour transversely, slight interstices e exist at the point of forward and rearward hinging of the aggregated metallic scales 3 4, which interstices are thoroughly closed through the longitudinal approaching and closing together of the aggregation of scales or plates by reason of the longitudinal contracting of the said strip at its lower earth-contiguous portion, incidental to the flattening of the underlying part of the shoe or wrapper A and contraction thereof caused by the weight said wrapper and inclosed air-tube is subjected to in the traveling of the rider-occupied bicycle or analogous vehicle.

The contour of the respective external plates or scales 4 is that of a turtleback or oval, each plate having lateral prongs $f\ f$ and also one at an end $g$, and provided at the other extremity with a small elongated aperture or interstice $e$, heretofore referred to in a general way.

The prong $g$ of each plate 4 is inserted through the aperture $e$ of the companion plate and then bent over at the rear in hook shape, creating a loose joint, the aperture in the several plates being transverse to the plate's length and sufficiently large to permit of requisite play, the respective interstices $e$ practically being closed when the metallic strip A' is contracted by reason of the then snug closure by the penetrating hook-bent prongs, as may readily be perceived from the drawings.

The inner or backing plates 3 are respectively of an oval contour, and are severally provided with a central orifice $h$, slightly elongated in the direction of the plate's length. The forward face-scales 4 are connected with the underlying scales 3 by means of the contiguous side prongs $f$ of each of the transversely-parallel scales 4, passing through, side by side, an orifice $h$ of the under scale 3 and bent over the back thereof in opposite directions, and so on through the series. As is clearly shown, the series of plates 3 lie intermediately the plates 4. Moreover, the said metallic scales, preferably struck out by suitable dies from sheet-steel or other light and tenacious metal, are disposed in parallel rows both longitudinally and transversely the mail-created strip A', and the clenching of the several scales together in flexible connection may be accomplished by any satisfactory kind of tools or machinery.

A backing $i$ is provided to the metallic scales forming the mail-like strip, said backing preferably consisting of a layer of canvas of the same width as the metallic portion and continuous therewith and held to the scale-like strip A', and the same retained facingly thereto by means of the outer lateral prongs $f$ of the boundary edge located metal scales 4 being bent around the parallel edges of the textile backing $i$ and clenched over same, the function of the said side fastenings being to so retain the series of scales with the backing that any disengagement of one scale from another will be an impossibility.

While the additional weight conveyed to a customary twenty-eight-inch tire by the utilization of my protective strip will be approximately about fourteen ounces, that increase of the tire's weight is inconsequential in view of the fact that absolute prevention of the puncturing of the air-tube is attained, while insuring to the tire formation all requisite resiliency and elasticity and pliability, and the life of the tire is very evidently exceedingly increased.

Whether a single or a double tube tire be employed, the applicability of the mail-like puncture-preventing strip is the same, the essential matter being such disposal or interposition thereof as will insure no opportunity for the penetration of the points of tacks, &c., into the air-chamber of the tire.

Obviously the employment of the flexible mail-strip as a barrier against penetration of the air-tube admits of the utilization of a much thinner and lighter air-tube, as shoe or covering as well, there being no liability of detrimental perforating of the tire embodying in its formation said defensive strip.

Thorough practical tests upon my part of my improved pneumatic tire has demonstrated to my complete satisfaction its value, efficiency, and durability, and its absolute immunity from any puncturing possible of effecting the inflated air-tube through any usage same would be calculated to receive.

Having thus fully described my invention, what I claim as new, and desire to secure by Letters Patent, is—

1. A pneumatic tire provided circumferentially its air-chamber and interiorly its tread-surface with a flexible mail-like strip of laminated scale-like formation continuous with the portion it covers, and consisting of upper and lower stratas or rows of scales running both longitudinally and transversely parallel, the outer face-scales slightly overlapping each other in one direction and non-lapping in the other, and flexibly connected, and they respectively connected to the inner-lying scales in a manner to allow of flexibility of parts, and a flexible non-metallic backing-strip secured to and covering the inner series of plates, all combined and operating substantially as described.

2. A pneumatic tire provided internally its tread portion with an annular mail-like strip comprising a series of metallic scales, an outer and an inner layer, the outer scales being movably connected one to the other longitudinally, and the inner scales alternately disposed between the outer scales and yieldingly connected therewith, said plurally-formed mail-like strip being capable of slight expansion or contraction longitudinally, and flexible both longitudinally and transversely, the outer scales being arranged in parallel rows, and the inner scales being disposed in parallel rows located intermediately the outer or face rows, substantially as and for the purposes described.

3. The combination, with the tread portion of the air-tube or wrapper of a pneumatic tire, of a flexible metallic strip of annular shape seated within the elastic material of the tube or wrapper, the said strip comprising double layers or laminæ of conjointly-connected plates or scales disposed both longitudinally and transversely in parallel rows, the outer plates slightly overlapping each other in one direction, and the inner plates substantially covered by the outer plates, the outer or external plates being respectively provided with bent prongs or hooks at their opposite edges, like bent prongs or hooks forwardly, and perforations at their opposite extremities, the forward prongs passing into and hookingly retained in the perforation of the contiguous plate, and so on through the rows of the series, the inner or backing plates having central orifices, longitudinally elongated, and side prongs or hooks of the external plates passing through the orifices aforesaid and flexibly retaining the outer and inner plates in juxtaposition, said protective strip being adapted to longitudinal play, and to curvature both longitudinally and crosswise, all arranged and operating substantially as described and for the purposes specified.

In testimony whereof I affix my signature, in presence of two witnesses, this 5th day of September, 1895.

LEWIS J. MILLER. [L. S.]

Witnesses:
 WM. C. RAYMOND,
 GEO. D. WIEDRICH.